United States Patent [19]

Andrews et al.

[11] Patent Number: 5,585,628
[45] Date of Patent: Dec. 17, 1996

[54] METHOD OF SURFACE SURVEYING FOR RADIOACTIVE SOURCES

[75] Inventors: John P. Andrews, Knoxville; Gerard V. Policastro, Cookeville, both of Tenn.

[73] Assignee: Westinghouse Electric Corp., Pittsburgh, Pa.

[21] Appl. No.: 497,266

[22] Filed: Jun. 30, 1995

[51] Int. Cl.$^6$ .................................................. G01V 5/00
[52] U.S. Cl. ................................................................ 250/253
[58] Field of Search ................................................ 250/253

[56] References Cited

U.S. PATENT DOCUMENTS

| | | | |
|---|---|---|---|
| 3,735,415 | 5/1973 | Craig | 346/33 B |
| 4,155,007 | 5/1979 | Beckmann | 250/253 |
| 4,924,450 | 5/1990 | Brashear et al. | 367/118 |
| 5,025,150 | 6/1991 | Oldham et al. | 250/253 |
| 5,214,281 | 5/1993 | Rowe | 250/253 |
| 5,324,948 | 6/1994 | Dudar et al. | 250/379 |
| 5,416,321 | 5/1995 | Sebastian et al. | 250/288 |

FOREIGN PATENT DOCUMENTS

| | | | |
|---|---|---|---|
| 364917 | 6/1980 | U.S.S.R. | 250/253 |

*Primary Examiner*—Constantine Hannaher

[57] ABSTRACT

A method of surveying a surface to determine the existence of a radiation source, e.g., a radioactive source, providing a procedure for determining an optimum scan velocity for scanning past a source so as to provide the required degree of confidence to detect the presence of radiation sources while avoiding false source detection. A first scan velocity is selected based upon detector information and the nature of the survey surface, following which spreadsheet-type calculations are made based upon the expected maximum source count rate, background rate and the selected velocity. The spreadsheet calculations provide an indication of the confidence of distinguishing source activity from background radiation at the selected scan velocity. The indicated confidence is compared to the required confidence level, and when the indicated confidence is not optimally close to the required confidence, another scan velocity is selected and the spreadsheet calculations are repeated. These steps are repeated iteratively until an indicated confidence is found which is optimally close to the predetermined confidence, following which the last selected scanned velocity is used in actually carrying out the surface survey.

34 Claims, 3 Drawing Sheets

METHOD OF SURFACE SURVEYING FOR RADIOACTIVE SOURCES

BACKGROUND OF THE INVENTION

This invention relates to radiation surveys and, in particular, a method for optimizing the speed of conducting a radiation survey of a surface so that the survey is done with of a high reliability of distinguishing true radiation sources from background.

Currently radiation surveys are performed by technicians with radiation detection equipment, wherein the technician listens to disintegration counts and attempts to determine when a change in count indicates a radioactive source, as contrasted to detector background. The technician physically scans an area, stopping at different points to set the detector or probe down and count for a predetermined time interval, following which a chart or map of surface activity is compiled. However, it is very difficult to reliably distinguish background from radioactive sources at low disintegration counts. In such circumstances, the only way to ensure reliability is to scan the site over a long period of time, i.e., either scan with a safely low velocity, or stop repeatedly at different surface locations. Regulatory requirements of the NRC require detecting the presence of radioactive sources with a 95% or greater reliability, while detecting false sources at a rate of 5% or less. This 95–5 ratio is the industry standard "minimum detectable activity," which is difficult to meet in low count situations.

Prior to this, surveys have necessarily taken a great amount of technician time, since the survey scanning has been done at arbitrarily low speeds in order to meet the probability requirements. Significant development has occurred in the area of automatic survey data collection, transmission and mapping. See U.S. Pat. Nos. 5,416,321; 5,025,150; and 4,924,450. However, there remains a crucial need to cut down the time for taking a reliable survey. It is clear that there would be, for any surface having a given radioactivity concentration or count expectation, an optimum speed which would be slow enough to achieve the desired reliability, but also fast enough to avoid excessive survey time while maintaining such reliability. The need in the art thus has been to provide an accurate and cost effective way of determining an optimum scanning speed which enables minimization of survey time while ensuring the required reliability.

SUMMARY OF THE INVENTION

It is an object of this invention to provide a spreadsheet-type method for determining an optimized scan rate for moving a detector across the surface of a site to be surveyed for radioactivity or other source radiation, providing the fastest speed and quickest consequent survey time consistent with required reliability of distinguishing real radioactive sources from background counts. The invention meets this objective by use of spreadsheet computer-based calculations and presentation of the results of such calculations to show, for different scan velocities, the probability of distinguishing background from source plus background counts with the required degree of confidence.

According to the present invention there is provided a method of surveying a surface having an expected source of radioactivity or other radiation within or below such surface, which method involves iterative steps of assuming respective velocities for scanning the surface with a detector of known characteristics, and making calculations to determine the probability of distinguishing the radioactive source from background at each such velocity. For each assumed scanning velocity, and for both background and expected source rates, respective spreadsheet calculations are made for the Poisson probability [p(i)] of observing a count and the cumulative decision probability [P(i)] as a function of counts, which probability distributions are plotted for a determination of overlap. By comparing the decision probability plots as the assumed velocity is changed, there is provided a relatively simple and quick means for determining the optimum velocity at which a source can be distinguished from background with a given degree of confidence, e.g., 95%. When this has been done, the survey is then carried out using conventional equipment, and at the calculated optimum detector velocity.

BRIEF DESCRIPTION OF THE PREFERRED EMBODIMENTS

Figure 1A:
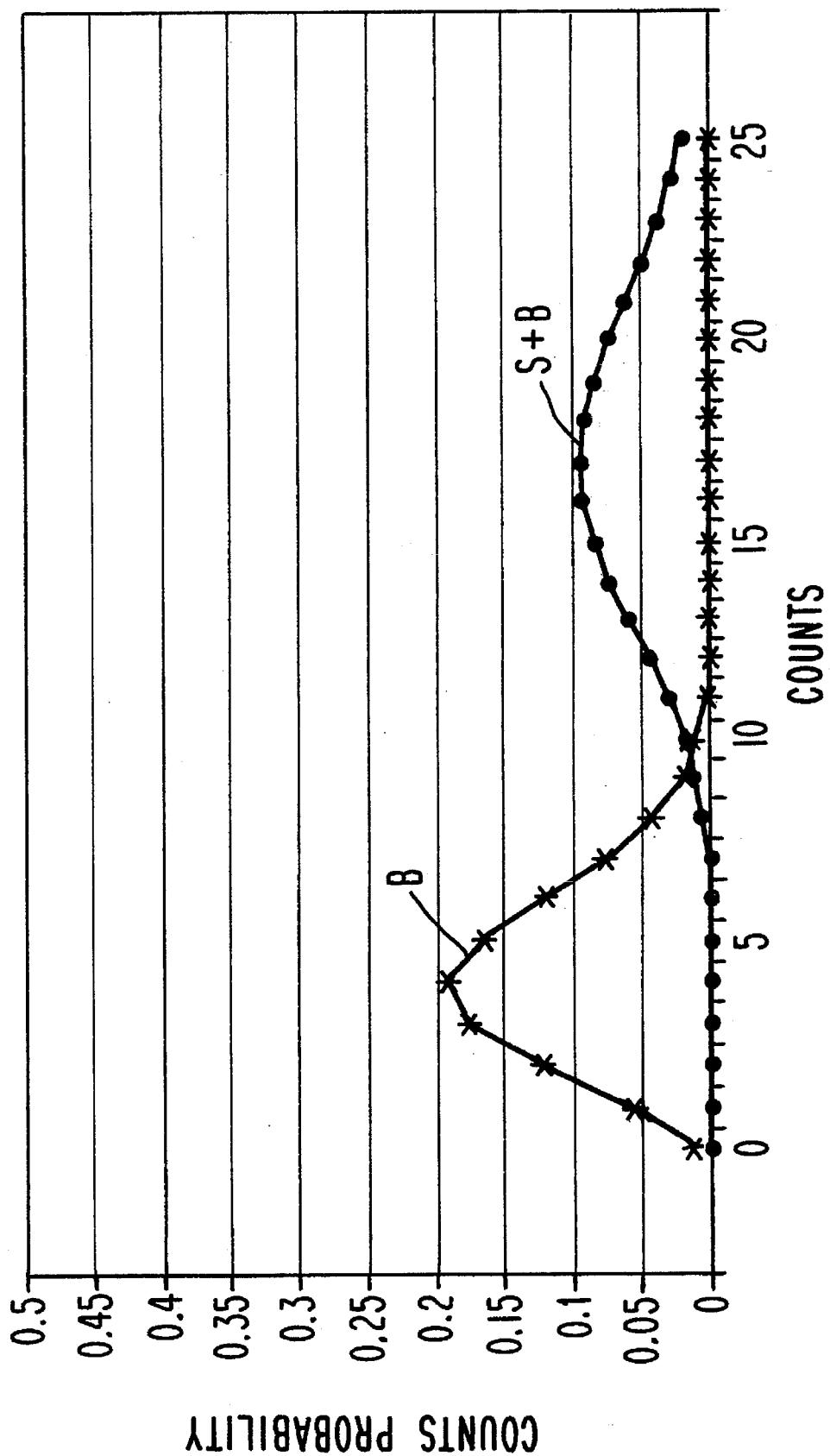
FIG. 1A is a plot of the Poisson counts probability as a function of counts for a detector pass at a given velocity, for both background (B) and source plus background (S+B)
Figure 1B:
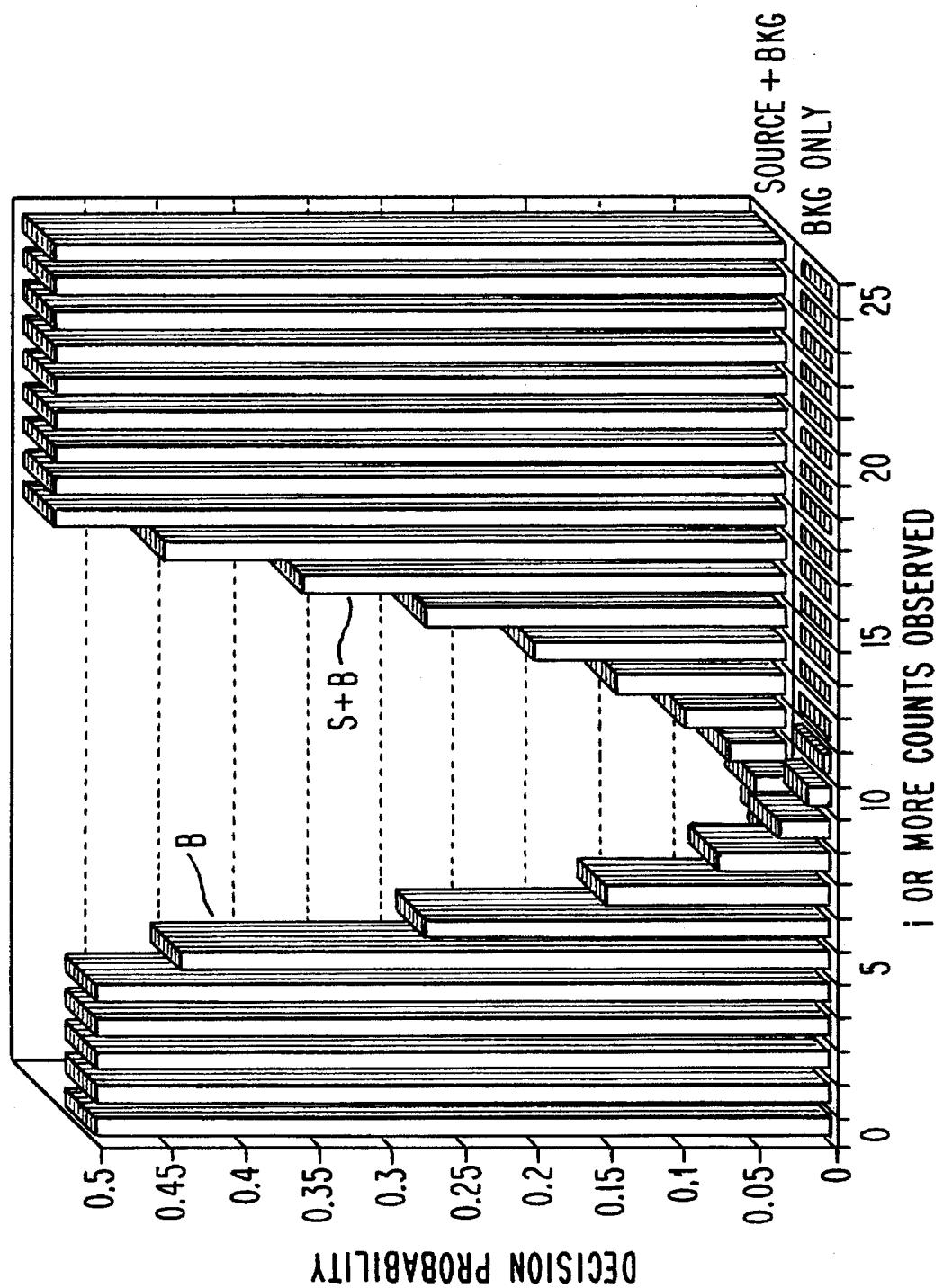
FIG. 1B is a plot decision of probabilities for background and source plus background respectively; specifically, it shows a truncated plot of the probability for each count that the count or a greater count accurately represents background radiation; and a truncated plot of the probability for each count that the count or a lesser count accurately represents source plus background radiation.

Referring now to the figures, there follows an explanation of the preferred embodiments of the method of this invention. Broadly, as seen in FIGS. 1A and 1B, the method entails obtaining spreadsheet calculations and plots of counts probability and decision probability for surveying at a given scan velocity. FIG. 1A shows a representative plot of Poisson distributions based upon a predetermined background (B) of 350 cpm, and a theoretical point source (S+B) having an expected maximum of 5000 dpm/100 $cm^2$, with a detector having an efficiency E=0.21 cpm/dpm and length d of about 11 cm, for a detector scan past the source at a scan velocity of 15 cm/sec. As seen in this set of curves, the Poisson distribution $P_B(i)$ in terms of counts probability for the background (B) is centered at about 4.5 counts. The Poisson distribution $P_{s+B}(i)$ of counts probability of the source and background taken from a scan past the source is centered at around 17.5. Thus, the most probable count for a scan of the point source with the detector at a velocity of 15 cm/sec is in the area of 17.5 counts, and the probability of a count below 10 above about 25 is very low.

In FIG. 1B, there are shown plots for the decision probability for background $P_B(i)$, and source plus background $P_{s+B}(i)$ respectively. These plots are derived from the respective Poisson distributions of FIG. 1A. The left-most plot, truncated at 0.5 decision probability, shows the cumulative probability $P_B(i)$ that the background count is a value i or greater (summation of $p_B(i)$, to ∞). As seen through a count of about 5, the probability is greatest; the probability decreases with counts increasing above about 5, until at a count of about 10 the probability that such count represents background is shown to be at about only 5%. Thus, one can decide that the probability of the background count for a scan past the source at 15 cm/sec is no greater than 5% at a count of 10, and even less for higher counts. The right hand plot shows the cumulative probability $P_{s+B}(i)$, derived from summing the probabilities of $P_{s+B}(i)$ from 0 to i. As shown here, at a count i=10, the probability has risen to only about 5%, meaning that there is a 95% confidence level that the source plus background count is greater than 10. As shown by the juxtaposition of these two graphs, the overlap of the decision probabilities (at i=about 10) is 5% or lower, from which one can conclude that this scan velocity is suitable for providing a clear distinction of source counts from background counts with at least a 95% probability.

With this observation, it can now be seen that an important feature of the method of this invention is to find a velocity v which is optimized in terms of providing the required degree of confidence at the fastest possible speed. Referring again to FIG. 1A, if the detector speed was initially chosen to be slower than 15 cm/sec, the two decision plots would be spaced further apart; as a consequence, the decision probability graphs that would result, corresponding to FIG. 1B, would show a gap between the 5% decision probability for background, and source plus background respectively. Conversely, if the chosen detector velocity was faster than 15 cm/sec, the Poisson distribution curves would have greater overlap, and the decision probability plots would show an overlap at a decision probability of greater than 5%. The aim is to select a velocity which results, as closely as possible, in an overlap at about 5%. Consequently, the method of this invention involves making a first choice of detector velocity based upon the information available and the best judgment of the technician, and doing the spreadsheet calculations to provide an output indication corresponding to FIG. 1B, or any other representation allowing a determination of overlap; and then iteratively selecting new velocity values until a decision probability of the required confidence level, to within allowed tolerances, is found. It is, of course, necessary that the velocity be low enough to ensure the required confidence level, but at the same time it is desired to have the velocity fast enough to achieve the desired confidence level while also minimizing scanning time as much as possible, thereby minimizing the expense of the survey that it to be undertaken.

Figure 2:
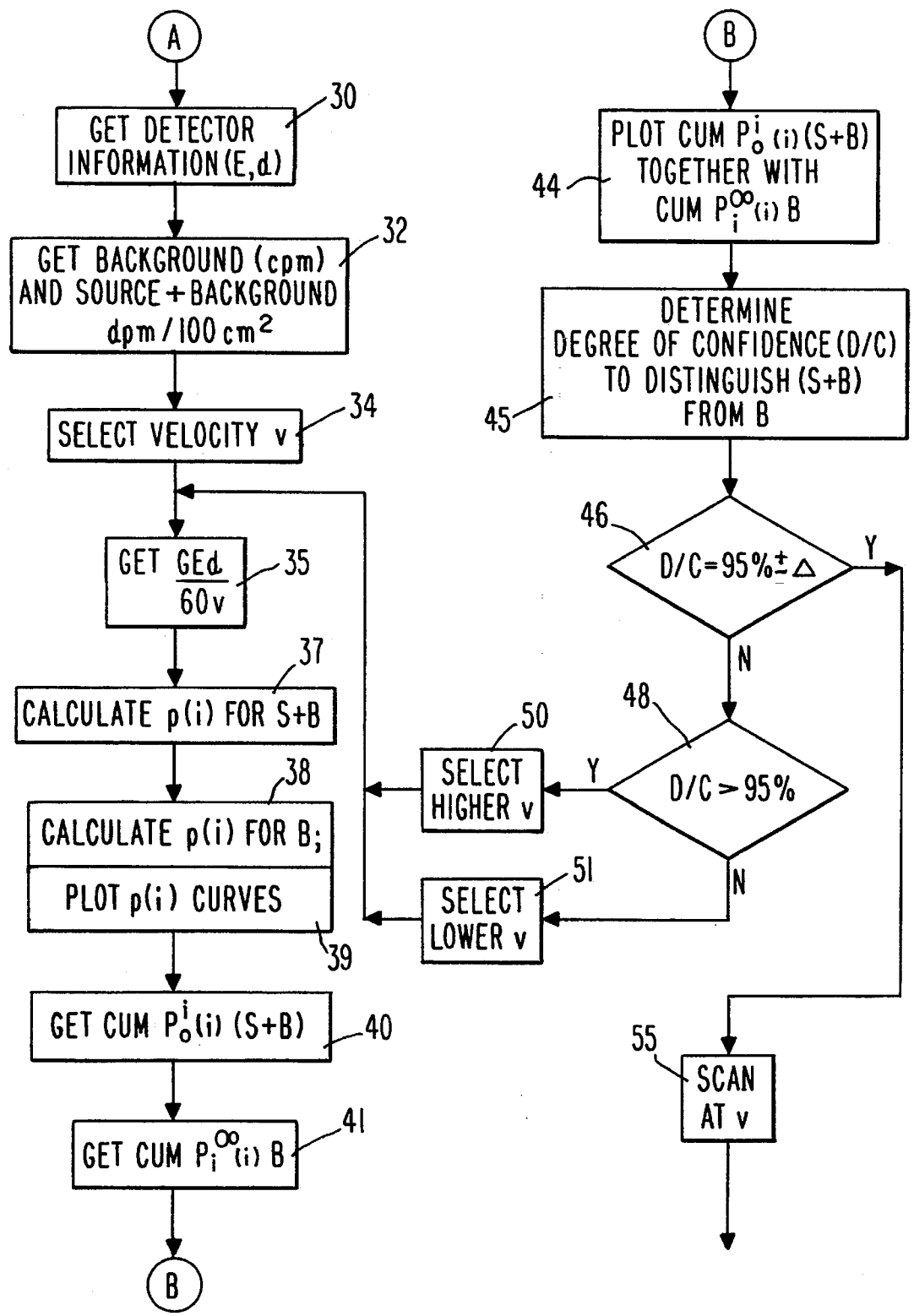
FIG. 2 is a flow diagram of the steps of the method of this invention.

Referring now to FIG. 2, the specifics of the calculations and the steps of the preferred embodiment of this invention are disclosed. The method is shown in software form, and may be carried out using any computer that can accommodate a spreadsheet program for making the calculations as indicated. A suitable spreadsheet program is QUATTRO PRO™ by Borland International.

At step 30, detector information concerning the detector counting efficiency E (counts/disintegration) and detector mean length (in the direction of travel) d are determined. For the example of FIG. 1A, E=0.21, and d=11 cm. At step 32, the background count rate, in terms of counts per minute (cpm) is determined. Background rate (B) is obtained in a known fashion by holding the detector in the vicinity of the surface to be examined, shielding it from source radiation, and obtaining a reading of counts per minute. Such background counts may come from instrument noise, or from random alpha, beta or gamma radiation from the environment. For the example of FIG. 1A, B=350 counts per minute. The maximum source value G, in dpm/100 $cm^2$, is determined by the technician or surveyor by known calculations based on the detector and the nature of the surface to be surveyed. For the example of FIG. 1A, G=5000 max disintegrations per minute/100 $cm^2$.

At 34, the operator selects a first velocity v, which selection uses known calculations and is based upon the detector characteristics. Optimally a first scan speed is chosen so that a given level of counts will be observed during the scan with a frequency of at least 50% when the detector passes over a source of the maximum intensity G. Following this, at 35 a determination is made of the expectation value of counts, during a scan past the source G during the time period of t=d/v sec, i.e., GEd/60 v. For this example, as illustrated in FIG. 1A, the expectation value for the source and background is 17.46 counts, while the expected background count is 4.37. Next at 37, the Poisson probability $P_{s+B}(i)$ of observing each count i during the scan time t is calculated, using the expectation value calculated at step 35. The formula for the Poisson distribution is: p(i)=e^−(GEd/60v)×(GEd/60v)^i/i! See "Surface Radioactivity Guides For Materials, Equipment, and Facilities To Be Released For Uncontrolled Use", HPS Draft Standard PN13.12, November 1987.

The calculation is made using the spreadsheet program. Note that the S +B curve in FIG. 1A is centered about the S+B value of about 17.46 counts. Then, at 38, the Poisson distribution $p_B(i)$ for the background alone is calculated, and as shown in FIG. 1A is centered around 4.37 for this example. These two calculations are plotted out as illustrated at block 39, being displayed either on a computer driven terminal screen and/or with a hard copy printout, or produced in any known manner. Next, the cumulative decision probability values P(i) are obtained at blocks 40 and 41. As illustrated at block 40, the cumulative probability of $P_{s+B}(i)$, the sum of p(i) from 0 to i, or cum $P_{s+B}(i)$ is determined for S+B. As seen in FIG. 1B, this decision probability $P_{s+B}(i)$ represents the probability that the source plus background count is a value of i or less. At block 41, the sum of $p_B n(i)$ is cumulated from i to ∞, to get the decision probability $P_B(i)$, which represents the probability that the background count is the value i or more.

The routine goes to block 44, and plots the two decision probability plots, as represented in FIG. 1B. Then, at 45, the operator, by examination of the plots, determines the degree of confidence (D/C) to distinguish the detector count (source plus background) from background alone. This is done, as discussed above, by determining the overlap of the two decision probability plots. If there is no effective overlap, the velocity is too slow. If there is an overlap, the operator must determine the probability corresponding to the overlap and specifically determine whether that probability is less than 5%. While in the preferred embodiment this determination is made by inspecting the plots, it is to be understood that this comparison may be made automatically by a computer, with a resulting output provided of the degree of confidence corresponding to the velocity for which the calculations have just been made.

Following the determination of confidence level, the operator decides whether or not the confidence level is at 95%, within specified tolerances. For example, a velocity may be selected which yields a confidence of 95–96%, or 95–98%. The 95% level of confidence is a regulatory level established by the Nuclear Regulatory Commission. It is to be understood that the invention is not limited to the 95% level, but, subject to regulatory requirements, could be practiced at any other chosen level.

If, for any selected velocity, the degree of confidence is found to be at the 95% level, the next step is to actually carry out the survey at the scan speed v, as indicated at 55. However, if the degree of confidence is not at the required 95% level, at block 48 it is determined whether it is greater than or less than 95%. If greater than 95%, this means that the last examined velocity is unnecessarily slow, and that 95% confidence could still be achieved with a faster velocity. Accordingly, for a determined confidence level greater than 95%, the next step is to select a higher velocity, and then loop through the calculations again, from block 35 through to block 48. However, if the confidence level is less than 95%, this means a lower velocity must be selected, as indicated at block 51, following which steps 35–46 are again repeated. Of course, an experienced technician can extrapolate between velocities for which calculations have been performed, i.e., use a velocity slightly different from one for which the confidence level has been determined.

Referring to the survey, it is to be understood that the scan as shown at block 55, can be carried out in any manner, i.e., manually or automated. For a large operation, different surfaces with different expected sources can be scanned at different respective optimum velocities, within the scope of the invention. Further, the surveying method of this invention can be carried out before decontamination, in order to find the existence of sources; or after treatment, in order to certify decontamination.

The spreadsheet calculations indicated in the steps of FIG. 2 are illustrated in the following table, which is limited to a count of 10 for purposes of illustration:

TABLE 1

| i | i! | BKg + Source $(GEd/60v)^i$ | $p_{S+B}(i)$ | $P_{S+B}(i)$ | Bkg Only $(GEd/60v)^i$ | $p_B(i)$ | $P_B(i)$ |
|---|---|---|---|---|---|---|---|
| 0 | 1 | 1.00 | 0.0000 | 0.0000 | 1.0000 | 0.0127 | 1.0000 |
| 1 | 1 | 17.46 | 0.0000 | 0.0000 | 4.3653 | 0.0555 | 0.9873 |
| 2 | 2 | 304.89 | 0.0000 | 0.0000 | 19.0556 | 0.1211 | 0.9318 |
| 3 | 6 | 5323.69 | 0.0000 | 0.0000 | 83.1826 | 0.1762 | 0.8107 |
| 4 | 24 | 92957.23 | 0.0001 | 0.0001 | 363.1142 | 0.1923 | 0.6345 |
| 5 | 120 | 1.62E + 06 | 0.0005 | 0.0005 | 1.59E + 03 | 0.1679 | 0.4421 |
| 6 | 720 | 2.83E + 07 | 0.0015 | 0.0015 | 6.92E + 03 | 0.1222 | 0.2742 |
| 7 | 5040 | 4.95E + 08 | 0.0041 | 0.0041 | 3.02E + 04 | 0.0762 | 0.1521 |
| 8 | 40320 | 8.64E + 09 | 0.0097 | 0.0097 | 1.32E + 05 | 0.416 | 0.0759 |
| 9 | 362880 | 1.51E + 11 | 0.0205 | 0.0205 | 5.76E + 05 | 0.0202 | 0.0343 |
| 10 | 3628800 | 2.63E + 12 | 0.0190 | 0.0395 | 2.51E + 06 | 0.0088 | 0.0142 |

There has been described a procedure adapted for reliably determining an optimum scan velocity for surveying surfaces for radioactivity and the like. By use of the procedure set forth, the surveyor or operator is enabled to detect the presence of radioactive and other sources reliably, with a 95% or greater confidence level, while detecting false sources less than 5% of the time. By use of the spreadsheet calculations, an optimum velocity can be obtained, i.e., the fastest velocity which still yields a 95% confidence. The invention has resulted in scanning times significantly lower than previously required, e.g., as low as about 3–17 seconds for an application where recently the NRC suggested 1 minute per reading. It is to be understood that scanning can be supplemented by stopping and leaving the detector in one location for a longer period of time, thereby effectively repeating the count. Although illustrated specifically with an example for surveying surfaces having radioactive sources, the procedure of this invention also covers other like surveying applications where detection is a function of the surveying speed.

As stated above, the practice of the invention involves the expertise of the technician. Thus, a skilled technician may be able to select an appropriate scan velocity with minimal spreadsheet calculations. Indeed, a first such calculation can be accepted for use if the resulting calculations indicate a satisfactory degree of confidence. Accordingly, in the invention as claimed, the act of repetitively selecting velocities comprises one or more selections and corresponding spreadsheet calculations.

We claim:

1. A method of surveying a surface to detect a source of radioactivity, said survey being performed with a detector having predetermined characteristics, comprising:

determining a background count rate for said detector;

determining an expected source count rate from passing said detector over said source;

selecting a first detector scan velocity, and determining a first distribution of counts probability for said detector as a function of said background count rate at said first velocity, and a second distribution of counts probability for said detector as a function of the combination of expected source and background count rates at said first velocity;

obtaining from said first probability distribution a background decision probability distribution as a function of counts, and obtaining from said second probability distribution a combination decision probability distribution as a function of counts;

presenting said decision probability distributions, and determining from them whether the source activity can be identified with a predetermined degree of confidence;

iteratively selecting one or more detector scan velocities, and for each selected velocity repeating the above steps of determining distributions of counts probability and decision probability distributions and determining therefrom the degree of confidence of identifying source activity corresponding to each selected velocity, selecting, based on said determinations of degree of confidence, an optimum scan velocity at which source activity can be found with about said predetermined degree of confidence; and surveying said surface at about said optimum detector velocity.

2. The method as described in claim 1, comprising calculating said first and second probability distributions as Poisson distributions.

3. The method as described in claim 2, comprising using a computer and a spreadsheet program in determining said first and second probability distributions.

4. The method as described in claim 1, comprising using a computer and a spreadsheet program in determining said decision probability distributions.

5. The method as described in claim 4, comprising calculating said background decision probability distribution $P_b(i)$ to represent cum $p_B(i)$ for background from i to ∞, whereby said distribution represents the probability of deciding that the background count is i or greater.

6. The method as described in claim 5, comprising calculating said combination decision probability distribution $P_{S+B}(i)$ to represent cure $p_{S+B}(i)$ for source plus background from 0 to i, whereby said distribution represents the probability of deciding that the combined source and background count is i or lower.

7. The method as described in claim 6, wherein said predetermined degree of confidence is 95%.

8. The method as described in claim 6, wherein said presenting step comprises displaying plots of said distributions, and said determining step comprises determining the degree of confidence at the overlap of said plotted decision distributions.

9. The method as described in claim 8, comprising repeating said iterative steps by selecting velocities so as to move said overlap to about a 95% degree of confidence.

10. A method of determining a surveying velocity for scanning a detector past a source of radiation, comprising: repetitively selecting respective scan velocities; for each selected scan velocity, performing spreadsheet calculations of (a) the probability $P_B(i)$ of a detector count of i or greater being a true background count and (b) the probability $P_{S+B}(i)$ of a detector count of i or less being a true source+background count; determining from said probabilities a decision probability confidence that a selected velocity the source+background count can be distinguished from the background count; and selecting, on the basis of said determined confidences, a scan velocity that yields a confidence of a least a predetermined degree and is as low as is consistent with assuring said predetermined degree of confidence.

11. A method of surveying a surface which comprises scanning said surface with a detector at a selected velocity to determine the existence of a source of radiation from within said surface, said source having an expected maximum source count rate and said detector having a predetermined background count rate, said method including determining an optimum velocity for scanning said surface with said detector past said source to provide a predetermined confidence of distinguishing said source from said background radiation, said velocity determining step further comprising:

selecting a first scan velocity; making spreadsheet type probability calculations based upon said expected source rate, said background rate and said selected velocity;

providing from said calculations an indication of the confidence of distinguishing source from background radiation at said selected velocity; comparing the indicated confidence to a predetermined confidence; and when said indicated confidence is not optimally close to said predetermined confidence, selecting another scan velocity and repeating said making, providing and comparing steps iteratively until a said indicated confidence is optimally close to said predetermined confidence, and using the scan velocity corresponding to said indicated optimally close confidence in said surveying.

12. The method as described in claim 11, wherein said making comprises making a calculation of the distribution of probabilities that a background count of i or more is a true background count, and making a calculation of the distribution of probabilities that a source plus background count of i or less is a true count.

13. The method as described in claim 12, wherein said indication providing comprises providing a display of said distribution probabilities.

14. The method as described in claim 13, comprising providing said display as plots that show when the background distribution probability overlaps with the source plus background distribution probability.

15. The method as described in claim 13, comprising printing plots of said distribution probabilities.

16. The method as described in claim 11, wherein said making comprises first making poisson calculations of the count probabilities for the background, and the source plus background counts respectively.

17. The method as described in claim 11, comprising selecting said each another scan velocity so as to move toward the fastest velocity that yields said predetermined confidence.

18. The method as described in claim 17, wherein said predetermined confidence is about 95%.

19. The method as described in claim 11, comprising performing said calculations on a computer, and presenting said indication as plots.

20. The method as described in claim 11, comprising supplementing said scanning by stopping and leaving the detector in one location for a period of time to repeat the count of a source.

21. A method of surveying a site for a radiation source, comprising scanning said site with a detector at a scan velocity, said method comprising:

selecting a first scan velocity, and for said first velocity making a set of calculations which indicate the probability that a detected radiation count represents source radiation and not just background radiation;

selecting at least one more scan velocity and making said set of calculations for each selected scan velocity;

choosing a scan velocity of about a selected scan velocity for which a said set of calculations indicates an acceptable said probability; and scanning said site with said detector at said chosen velocity.

22. The method of surveying as described in claim 21, wherein said probability must be at least a predetermined probability, and said repeated selecting step comprises changing the last selected scan velocity in a direction so that the next scan velocity yields a calculated probability that is closer to said predetermined probability.

23. The method of surveying as described in claim 22, wherein said choosing comprises choosing a velocity that yields a said determined probability between 95 and 96%.

24. The method of surveying as described in claim 21, wherein said choosing comprises extrapolating from a plurality of said selected scan velocities.

25. The method of surveying as described in claim 21, comprising presenting graphs corresponding to each said set of spreadsheet calculations, and which graphs indicate the said probability.

26. The method of surveying as described in claim 21, wherein each step of making a set of calculations comprises computer spreadsheet calculations.

27. A computer system for determining whether scanning a predetermined surface with a given radiation detector at a selected detector scan velocity provides a predetermined degree of confidence of distinguishing a source plus background count from a background count, comprising:

first means for determining for a probability $P_B(i)$ of a detector count of i or greater being a true background count for said selected detector scan velocity;

second means for determining a probability $P_{S+B}(i)$ of a detector count of i or less being a true source background count for said selected detector scan velocity;

third means for determining a degree of confidence that for said selected detector scan velocity a source plus background count can be distinguished from a background count; and fourth means for determining whether said determined degree of confidence provides said predetermined degree of confidence.

28. The system as described in claim 27, further comprising fifth means for determining when said selected detector scan velocity should be higher or lower in order to achieve said predetermined degree of confidence.

29. The system as described in claim 28, comprising display means for displaying said determined degree of confidence.

30. The system as described in claim 27, comprising iteration means for selecting a different detector scan velocity and causing operation of said first means, said second means, said third means and said fourth means to determine whether said different scan detector velocity provides said predetermined degree of confidence.

31. The system as described in claim 27, wherein:

said first means comprises $P_B(i)$ means for determining a probability distribution $P_B(i)$ of observing a background count at said selected detector scan velocity, and means for cumulating $P_B(i)$ to determine said $P_B(i)$; and said second means comprises $P_{S+B}(i)$ means for determining a probability distribution $P_{S+B}(i)$ Of observing a source plus background count at said selected detector scan velocity, and means for cumulating $P_{S+B}(i)$ to determine said $P_{S+B}(i)$.

32. The system as described in claim 31, wherein each of said $P_B(i)$ and $P_{S+B}(i)$ means comprises respective means for calculating a Poisson probability distribution of counts.

33. The system as described in claim 27, further comprising display means for displaying a plot of said $P_B(i)$ and $P_{S+B}(i)$ values.

34. The system as described in claim 27, wherein said third means comprises overlap means to determine an overlap of $P_B(i)$ and $P_{S+B}(i)$.

* * * * *